United States Patent
Musil et al.

(10) Patent No.: US 7,525,951 B2
(45) Date of Patent: Apr. 28, 2009

(54) INTEGRATION OF E-MAIL WITH INSTANT MESSAGING SERVICES

(75) Inventors: Alex Musil, Mountain View, CA (US); Justin Uberti, Sterling, VA (US); Andy Wick, McLean, VA (US)

(73) Assignee: Netscape Communications Corporation, Mountain View, CA (US)

( * ) Notice: Subject to any disclaimer, the term of this patent is extended or adjusted under 35 U.S.C. 154(b) by 966 days.

(21) Appl. No.: 10/471,068

(22) PCT Filed: Mar. 7, 2001
(Under 37 CFR 1.47)

(86) PCT No.: PCT/US01/07319

§ 371 (c)(1),
(2), (4) Date: Mar. 23, 2004

(87) PCT Pub. No.: WO02/073886

PCT Pub. Date: Sep. 19, 2002

(65) Prior Publication Data

US 2005/0030937 A1    Feb. 10, 2005

(51) Int. Cl.
*H04L 12/56* (2006.01)
*G06F 15/16* (2006.01)

(52) U.S. Cl. .................... 370/352; 709/206
(58) Field of Classification Search ......... 370/352–356; 709/206, 207, 706, 707
See application file for complete search history.

(56) References Cited

U.S. PATENT DOCUMENTS

| 5,327,486 A | 7/1994 | Wolff et al. |
| 5,533,110 A | 7/1996 | Pinard et al. |
| 5,557,659 A | 9/1996 | Hyde-Thomson |
| 5,608,786 A | 3/1997 | Gordon |
| 5,721,906 A | 2/1998 | Siefert |
| 5,742,905 A | 4/1998 | Pepe et al. |
| 5,774,670 A | 6/1998 | Montulli |

(Continued)

FOREIGN PATENT DOCUMENTS

EP    0 862 304 A2    9/1998

(Continued)

OTHER PUBLICATIONS

Netscape Mail which is able to manage AOL Mail Account, MacPower 2000, Jul. 1, 2000, vol. 11, No. 1, p. 182-185 (in Japanese).

(Continued)

*Primary Examiner*—Chi H Pham
*Assistant Examiner*—Ahmed Elallam
(74) *Attorney, Agent, or Firm*—Michael A. Glenn; Glenn Patent Group

(57) ABSTRACT

A system for instant communication in real time is described wherein it is determined if a user with a given e-mail address is available for on-line messaging. The system takes in a group of e-mail addresses and automatically looks for screen names that are available for instant messaging. Once a screen name is available for online communication, an ion appears next to the screen name. Instant messaging is achieved by pressing the icon. The screen names, the icons and the e-mail addresses all appear in the same window, thereby, integrating traditional e-mail addresses with instant messaging services making real time communication an effective tool.

12 Claims, 6 Drawing Sheets

U.S. PATENT DOCUMENTS

| | | | |
|---|---|---|---|
| 5,793,365 A | 8/1998 | Tang et al. | |
| 5,802,470 A | 9/1998 | Gaulke et al. | |
| 5,850,594 A | 12/1998 | Cannon et al. | |
| 5,870,744 A | 2/1999 | Sprague | |
| 5,872,521 A | 2/1999 | Lopatukin et al. | |
| 5,878,219 A | 3/1999 | Vance, Jr. et al. | |
| 5,893,091 A | 4/1999 | Hunt et al. | |
| 5,893,099 A | 4/1999 | Schreiber et al. | |
| 5,920,692 A | 7/1999 | Nguyen et al. | |
| 5,948,058 A | 9/1999 | Kudoh et al. | |
| 5,951,643 A | 9/1999 | Shelton et al. | |
| 5,951,652 A | 9/1999 | Ingrassia, Jr. et al. | |
| 5,954,798 A | 9/1999 | Shelton et al. | |
| 5,960,173 A | 9/1999 | Tang et al. | |
| 5,991,791 A | 11/1999 | Siefert | |
| 6,009,413 A | 12/1999 | Webber et al. | |
| 6,012,051 A | 1/2000 | Sammon, Jr. et al. | |
| 6,014,638 A | 1/2000 | Burge et al. | |
| 6,026,403 A | 2/2000 | Siefert | |
| 6,026,429 A | 2/2000 | Jones et al. | |
| 6,081,830 A | 6/2000 | Schindler | |
| 6,085,223 A | 7/2000 | Carino, Jr. et al. | |
| 6,151,584 A | 11/2000 | Papierniak et al. | |
| 6,166,730 A | 12/2000 | Goode et al. | |
| 6,260,148 B1 | 7/2001 | Aggarwal et al. | |
| 6,269,369 B1 | 7/2001 | Robertson | |
| 6,301,609 B1 | 10/2001 | Aravamudan et al. | |
| 6,389,127 B1 | 5/2002 | Vardi et al. | |
| 6,415,318 B1 | 7/2002 | Aggarwal et al. | |
| 6,425,012 B1 | 7/2002 | Trovato et al. | |
| 6,430,604 B1 | 8/2002 | Ogle et al. | |
| 6,446,112 B1 | 9/2002 | Bunney et al. | |
| 6,449,344 B1 | 9/2002 | Goldfinger et al. | |
| 6,484,196 B1 * | 11/2002 | Maurille | 709/206 |
| 6,525,747 B1 | 2/2003 | Bezos | |
| 6,535,586 B1 | 3/2003 | Cloutier et al. | |
| 6,539,421 B1 * | 3/2003 | Appelman et al. | 709/206 |
| 6,640,230 B1 | 10/2003 | Alexander et al. | |
| 6,714,793 B1 * | 3/2004 | Carey et al. | 455/466 |
| 6,772,188 B1 * | 8/2004 | Cloutier | 709/224 |
| 6,912,564 B1 * | 6/2005 | Appelman et al. | 709/204 |
| 7,032,023 B1 * | 4/2006 | Barrett et al. | 709/225 |
| 2002/0015061 A1 | 2/2002 | Maguire | |
| 2002/0021307 A1 | 2/2002 | Glenn et al. | |
| 2002/0023132 A1 * | 2/2002 | Tornabene et al. | 709/205 |
| 2002/0042816 A1 | 4/2002 | Bae | |
| 2002/0065894 A1 | 5/2002 | Dalal et al. | |
| 2003/0043201 A1 | 3/2003 | Abdelhadi et al. | |
| 2003/0140103 A1 | 7/2003 | Szeto et al. | |
| 2003/0200265 A1 * | 10/2003 | Henry | 709/206 |
| 2008/0065723 A1 * | 3/2008 | Corboy et al. | 709/203 |

FOREIGN PATENT DOCUMENTS

| | | |
|---|---|---|
| EP | 1176840 A1 | 1/2002 |
| WO | WO97/10558 | 3/1997 |
| WO | WO97/46955 | 12/1997 |
| WO | WO98/16045 | 4/1998 |
| WO | WO99/08434 | 12/1999 |
| WO | 02/073886 | 9/2002 |

OTHER PUBLICATIONS

Netscape Mail which is able to manage AOL Mail Account, MacPower 2000, Jul. 1, 2000, vol. 11, No. 1, p. 182-185 (English Translation).

Checking New Features of the Open Source Web Browser, Netscape 6, MacPower 2000, Jun. 1, 2000, vol. 11, No. 6, p. 52-55 (in Japanese).

Checking New Features of the Open Source Web Browser, Netscape 6, MacPower 2000, Jun. 1, 2000, vol. 11, No. 6, p. 52-55 (English Translation).

Netscape 6 Super Quick Guide, Mac Fan Internet, Feb. 1, 2001, vol. 6, No. 2, p. 98-111 (in Japanese).

Netscape 6 Super Quick Guide, Mac Fan Internet, Feb. 1, 2001, vol. 6, No. 2, p. 98-111 (English Translation).

Ability and Utilization of Free Net Service, Nikkei Pasokon, Sep. 20, 1999, No. 345, p. 192-201 (in Japanese).

Ability and Utilization of Free Net Service, Nikkei Pasokon, Sep. 20, 1999, No. 345, p. 192-201 (English Translation).

"Introducing the Gordano Messaging Suite"; http://www.gordano.com; Copyright 1994-2003 Gordano.

Eschenburg, A; "Wo laufen sie denn? ICQ halt Verbindung zu Bekannten" CT Magazin Fueh Computer Tecknik, Verlag Heinz Heise Gmbh., Hanover, DE, No. 22, Oct. 1998.

Khoda, Y. et al. "IMPP: A New Instant Messaging Standardf and it's Impact on Internet Business", Fujitsu-Scientific and Technical Journal, Fujitsu Ltd. Kawasaki, Japan, vol. 36, Dec. 2000.

* cited by examiner

Subj: My mail
Date: Jan. 10, 2001
From: Me
To: X,Y,Z
cc: A,B,C

Hi,
    I have seen ....

Buddy List

INTEGRATION OF E-MAIL WITH INSTANT MESSAGING SERVICES

TECHNICAL FIELD

The invention relates generally to software solving communication problems. More particularly, the invention relates to an integration of traditional e-mail with instant messaging systems in real time.

DESCRIPTION OF THE PRIOR ART

With the advent of computers, communication has never been easier. When friends and family are online, communication is much easier if invoked in real-time as it happens in instant messaging. Instant messaging using a computer invokes a real-time communication protocol.

In instant messaging using a real time communication protocol, real-time communication is possible if the screen name of users is known before one begins instant messaging. The list of screen names of users is not completely useful for communication in real-time if the user with that particular screen name is not online. This means that for real-time communication to be possible, not only should the screen name of users be known but also the users should be logged on before one begins instant messaging.

The end user usually has an address, referred to as 'e-mail address', which is specific to the user for communicating electronically on a computer or similar other devices. In electronic mail, messages can be sent, received, or stored at convenient times. In conventional e-mail systems, messages are delivered in "envelopes" which are then "opened" by the recipient to be read.

Conventional e-mail systems, operating across local area network boundaries, do not allow the senders of messages to determine whether their messages have been read. As a result, the sender of a message often must telephone the recipient to verify that the needed information has not only arrived at the recipient's system, but has been reviewed by the recipient.

Many proprietary e-mail systems, however, allow a sender to check a separate database to see if a message has been received. Some proprietary e-mail systems include an acknowledgement feature that allows the recipient's e-mail system to send a notification to the sender when the recipient has opened a message.

In prior art e-mail systems, the sender of an e-mail message has to wait a while for a response. In addition, the sender of the message is not sure if they would get an e-mail response. When users are logged into an e-mail, instant messaging in terms of AOL Instant Messenger is possible. America Online, Inc. of AOL Time Warner Inc. (AOL) pioneered the technology of instant messaging using a real time communication protocol.

In AOL Instant Messenger service, for example, the user could use any number of screen names while being logged into an e-mail address and communicate with other users instantly. However, for instant communication to be possible, one has to look up manually the screen name that is actually online currently for the associated e-mail address of the other users. The problem with that is because there could be more than one screen name associated with a single e-mail address, it becomes a difficult task to accomplish instant online messaging service manually with many active screen names.

In prior art systems, such as AOL's Mail Contacts Online, one has to be a member to make use of Instant Messaging service. Usually, such memberships entail a fee paid by the customer for using such services. In Mail Contacts Online service, the graphics window shows (FIG. 1) a divided window with e-mail communication window separate from the instant messaging window. The instant messaging window shows a buddy list with a list of screen names taken from the adjacent e-mail window and only those screen names that are available for instant messaging.

The difficulty with prior art systems is that they are not universally available unless the user requests membership to use the e-mail and/or Instant Messaging and pays a membership fee. With the availability of e-mail access to non-AOL members, the Instant Messaging service of prior art systems is limited in terms of number of screen names that are available in the buddy list. "Instant Messaging" is an AOL TM, so it is used herein to refer to "AOL Instant Messenger" for AOL members.

Given the number of Instant Messaging type services currently available, there is a need for integrating Instant Messaging services to e-mail services such that a user with access to any e-mail service, not limited to AOL member services, can use AOL's free Instant Messaging service and, thereby, achieve communication in real-time.

What is needed, therefore, is a generic service where anyone with access to an e-mail and instant messaging service can chat with anyone else instantly. The generic services should allow a graphic window with e-mail and instant messaging services to go simultaneously and smoothly so that the instant messaging is realized instantly in real time.

SUMMARY OF THE INVENTION

This invention provides a mechanism for the automatic integration of traditional e-mail with instant messaging services such that instant communication is provided in real-time. In one embodiment of the invention, the system has a single generic graphics window with both e-mail addresses and on-line chat addresses next to it so that anyone with access to the e-mail address could start the AOL's free instant messaging service instantly. The active screen names that are available for instant messaging would have an icon next to the screen name, such that instant messaging is achieved by pressing the icon as it appears next to the screen name.

In the particular embodiment of the invention, the system takes in a group of e-mail addresses and makes a request for a list of screen names from the instant messaging service associated with that e-mail address. The system then automatically verifies each screen name that is available for online communication. Once a particular screen name is available for instant communication, the system correlates that screen name to that particular e-mail address. An icon appears next to the screen name that is available for online instant messaging. Instant messaging is accomplished by pressing the icon as it appears next to the active screen name.

In one embodiment, the system sets up a list of screen names for tracking their online presence into a buddy list. In yet another embodiment, the system is associated with a user interface (UI) that prevents others from knowing the person's screen name. In yet another embodiment, the system allows a manual search when the screen name is not currently used but still associated with the same e-mail addresses.

Next, the system enquires of the user associated with that particular screen name for online communication. The recipient can choose to communicate with the user by clicking the icon associated with the screen name that is currently available for instant communication. Thus, the system establishes instant messaging in real time.

BRIEF DESCRIPTION OF THE DRAWINGS

FIG. 1 is a graphic representation of a prior art approach to indicating separate windows for e-mail addresses and instant messaging respectively;

DETAILED DESCRIPTION OF THE INVENTION

Figure 1A:
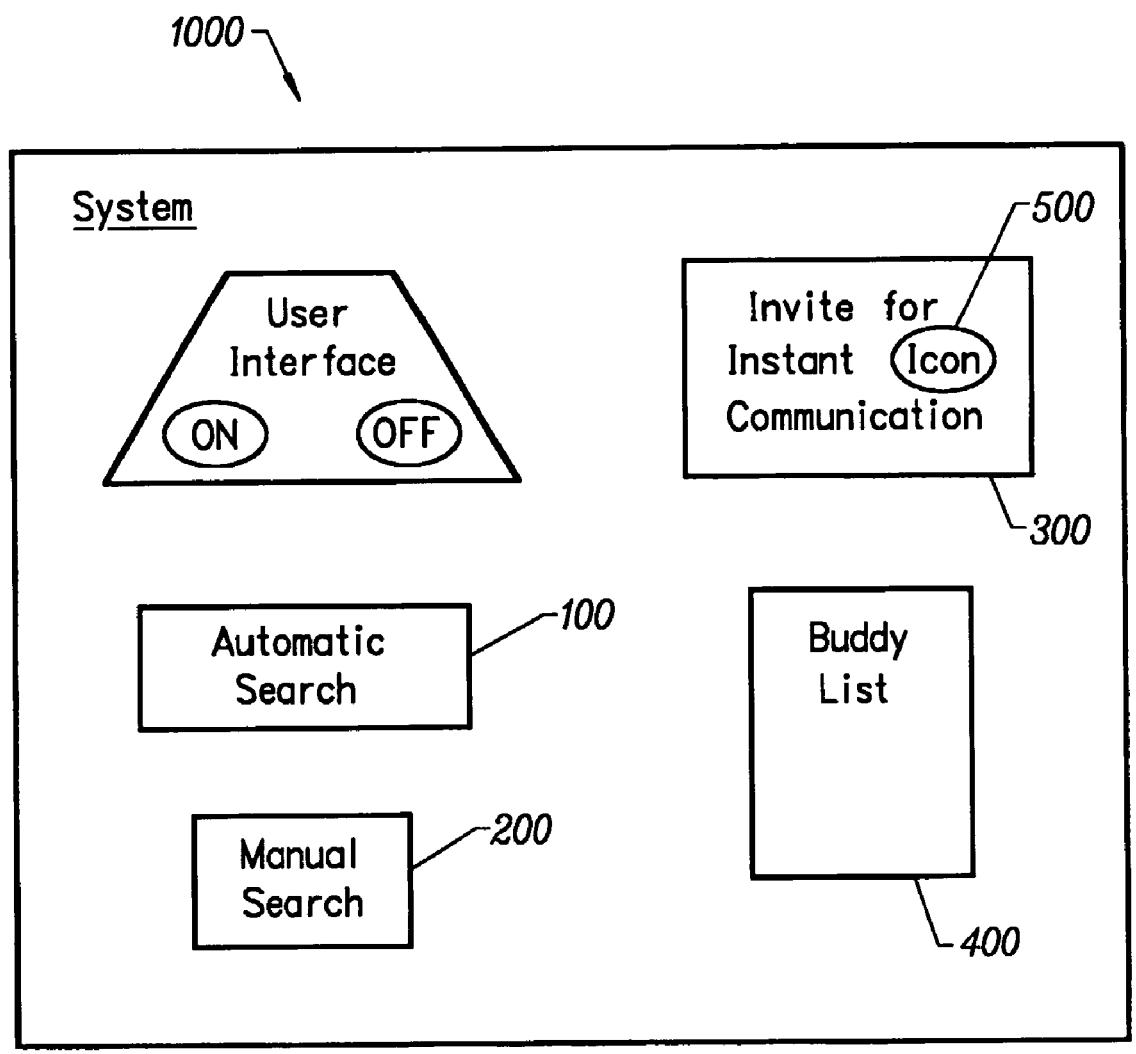
FIG. 1A is a representative block diagram of the elements of a preferred embodiment of the invention for integrating traditional e-mail with instant messaging services for the purpose of providing communication in real-time.

In commercially available electronic mail systems today, senders are able to send messages over a variety of networks such as local area networks, wide area networks, Internet, wireless networks, and the like. This does not, however, mean senders of the message would get an e-mail response instantly.

When users are logged into an electronic mail or e-mail, instant messaging is possible if the recipient's screen name and e-mail address are known. Because users could use any number of screen names while being logged into an e-mail, this communication is, however, not instant communication in real-time. More often than not, it takes manually for a user to retrieve the screen name that is associated with that e-mail address and that is currently being used for on-line communication.

This invention (FIG. 1A) provides a system for automatic integration 1000 of traditional e-mail with instant messaging service, more particularly, AOL's free Instant Messaging service for the purpose of providing communication in real-time. The invention comprises a system that takes in a group of e-mail addresses and makes a request for a list of screen names associated with that e-mail address from the instant messaging service. The system is associated with a user interface (UI) that protects the user's screen name if the user is not interested in on-line communication (represented in FIG. 1A as OFF) and prefers to not make his screen name available to recipients of his messages. When the user screen name is not available to the system, the system makes a manual search 200 for the screen names that are associated with that e-mail address. The problem with a manual search 200 using only knowledge of available e-mail addresses is that when a user manually does a search for screen names, there is no contextual information to indicate if the person is actually online or which screen name is being used. Because this becomes tedious, an invitation 300 is sent to the user for participation in on-line communication and a request for screen name applicable and used with that e-mail address.

Often the user is interested in on-line communication and would not mind if the screen names were available for on-line messaging. This is shown symbolically as an 'ON' state on user interface (UI) in FIG. 1A and the invention allows for automatic search 100. The system then automatically 100 verifies each screen name that is available for online communication. Once a particular screen name is available, the system then correlates that screen name to that particular e-mail address. In one embodiment, the system periodically tracks a list of screen names for tracking their online presence and puts them into a buddy list 400.

An online real-time communication is established once the icon 500 is activated next to the screen name for instant messaging. The recipient can choose to communicate to the user by clicking on the icon associated with the screen name where the user is currently available for instant communication. Thus, the invention establishes instant messaging in real time.

Figure 2:
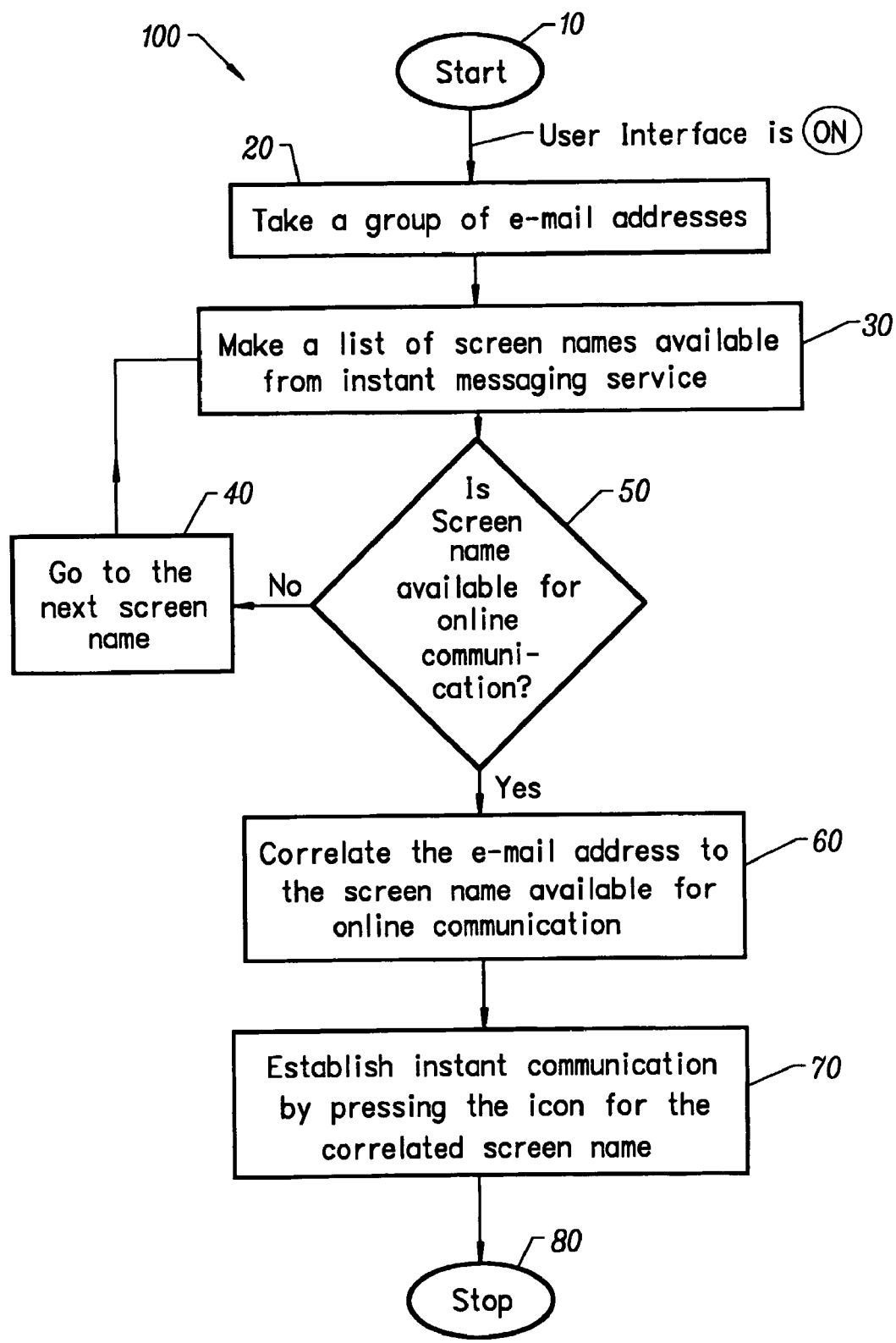
FIG. 2 is a flow chart showing a mechanism for enabling an automatic real-time communication via e-mail according to this invention.

FIG. 2 is a flow chart showing a mechanism for enabling instant communication using an automatic 100 (FIG. 1A) real-time communication via e-mail. When the user interface is enabled 10 (or is ON as in FIG. 1A), the method involves taking in a group of e-mail addresses 20 and making a request for a list of screen names from an instant messaging service associated with that e-mail addresses 30. An automatic verification of screen names available for real-time communication 50 is performed for each individual screen name. If there is a screen name available for instant messaging, the system correlates the screen names available for that particular e-mail address 60 and establishes real-time communication 70 by pressing an icon 500 (FIG. 1A) with that particular screen name. If there is no screen name available for instant messaging, the system cannot correlate the screen name with that particular e-mail address and simply continues the search for the next available screen name 40 for real-time messaging. When real-time communication is established using the described automatic search 50, the system is said to have accomplished it's task and comes to a stop 80.

Figure 3:
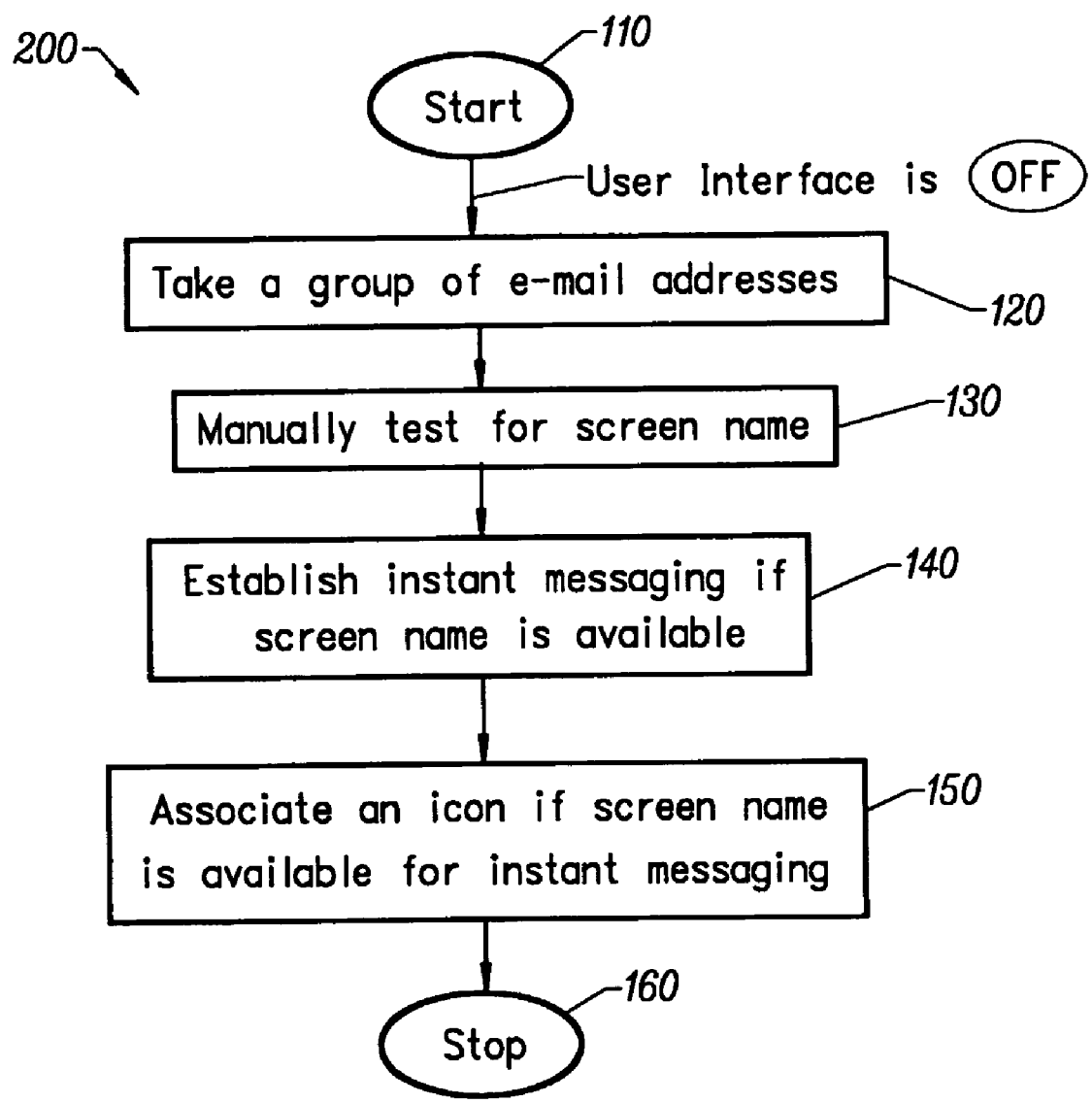
FIG. 3 is a flow chart of another embodiment of the invention showing a mechanism for enabling availability of a manual option for real time communication.

FIG. 3 is a flow chart showing a mechanism for enabling real-time communication using a manual 200 (FIG. 1A) search for the screen name. When the user interface is not enabled 110 (or is OFF as in FIG. 1A), the method involves taking in a group of e-mail addresses 120 and making a list of screen names by manually looking for screen names 130 associated with that e-mail address and establishing instant messaging 140 if screen name is available. When real-time communication is established using the described manual search 130, the system then associates an icon (refer to 500 in FIG. 1A) 150 with the screen name that is available for instant messaging. The system is said to have accomplished its task and comes to a stop 150.

Figure 4:
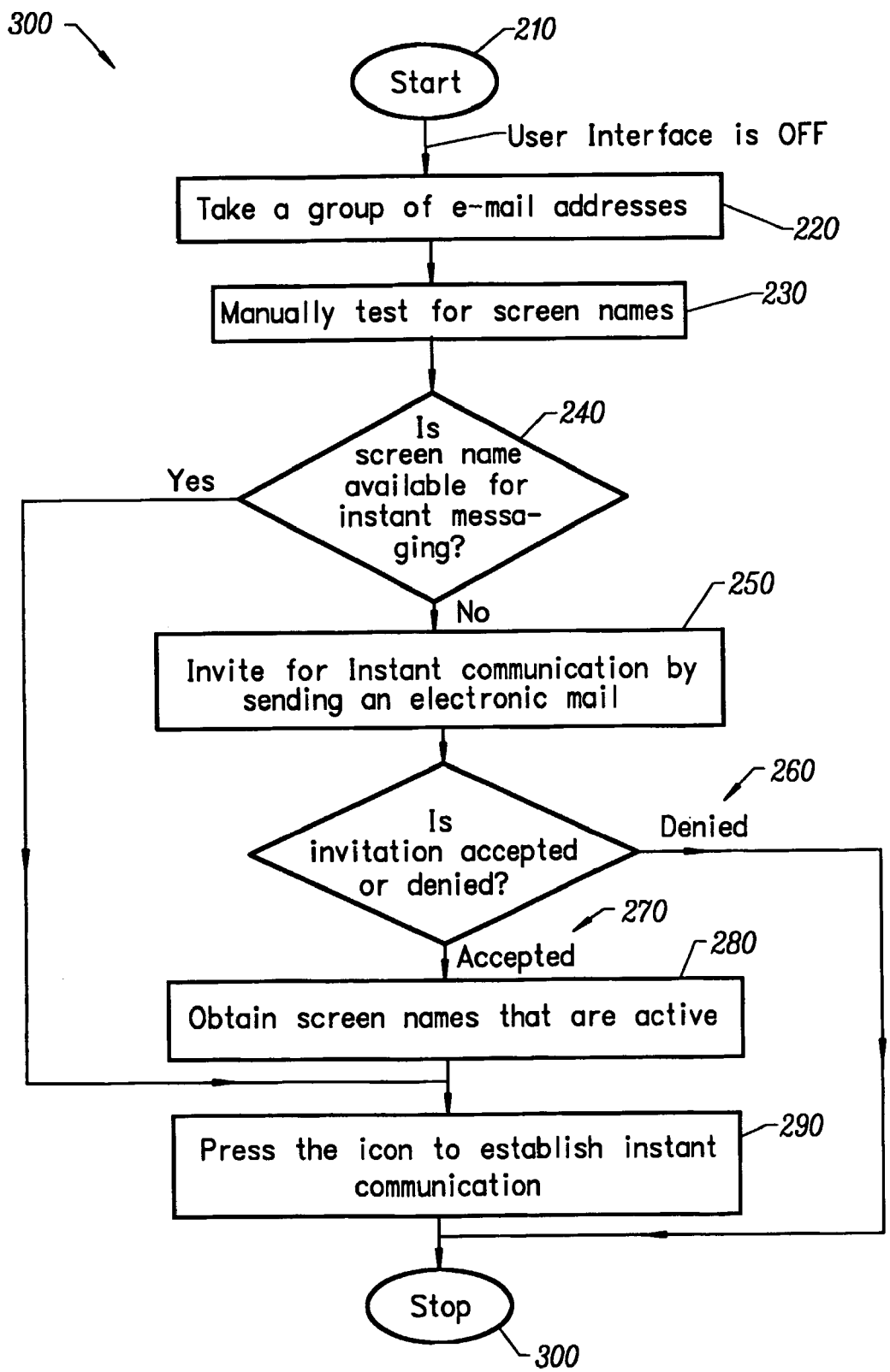
FIG. 4 is a flow chart showing a mechanism for inviting the user for instant communication to establish real-time communication according to the invention.

FIG. 4 is a flow chart showing another embodiment of the invention, which comprises, inviting the user for instant communication and requesting the user for screen name for real-time communication when the user interface (UI) is not enabled 210 (OFF in FIG. 1A). This embodiment is useful in prompting the user for real-time communication when the user does not wish to disclose his screen name to all individuals on the internet. The system takes in select group of e-mail addresses 220, manually tests for screen names available for instant messaging 230. If screen name is available 240 for instant messaging, the icon 500 (FIG. 1A) is pressed and instant messaging is established.

If the screen name is not available for instant messaging, then the system invites the user for instant communication 250 by sending an electronic mail or e-mail. If the invitation is accepted 270, then the system obtains the user's screen name 280, and establishes a real-time communication 290 when the icon 500 (FIG. 1A) is pressed. The system function is completed as real-time communication is established and comes to a stop 300 or if the invitation is not accepted 260.

Figure 5:
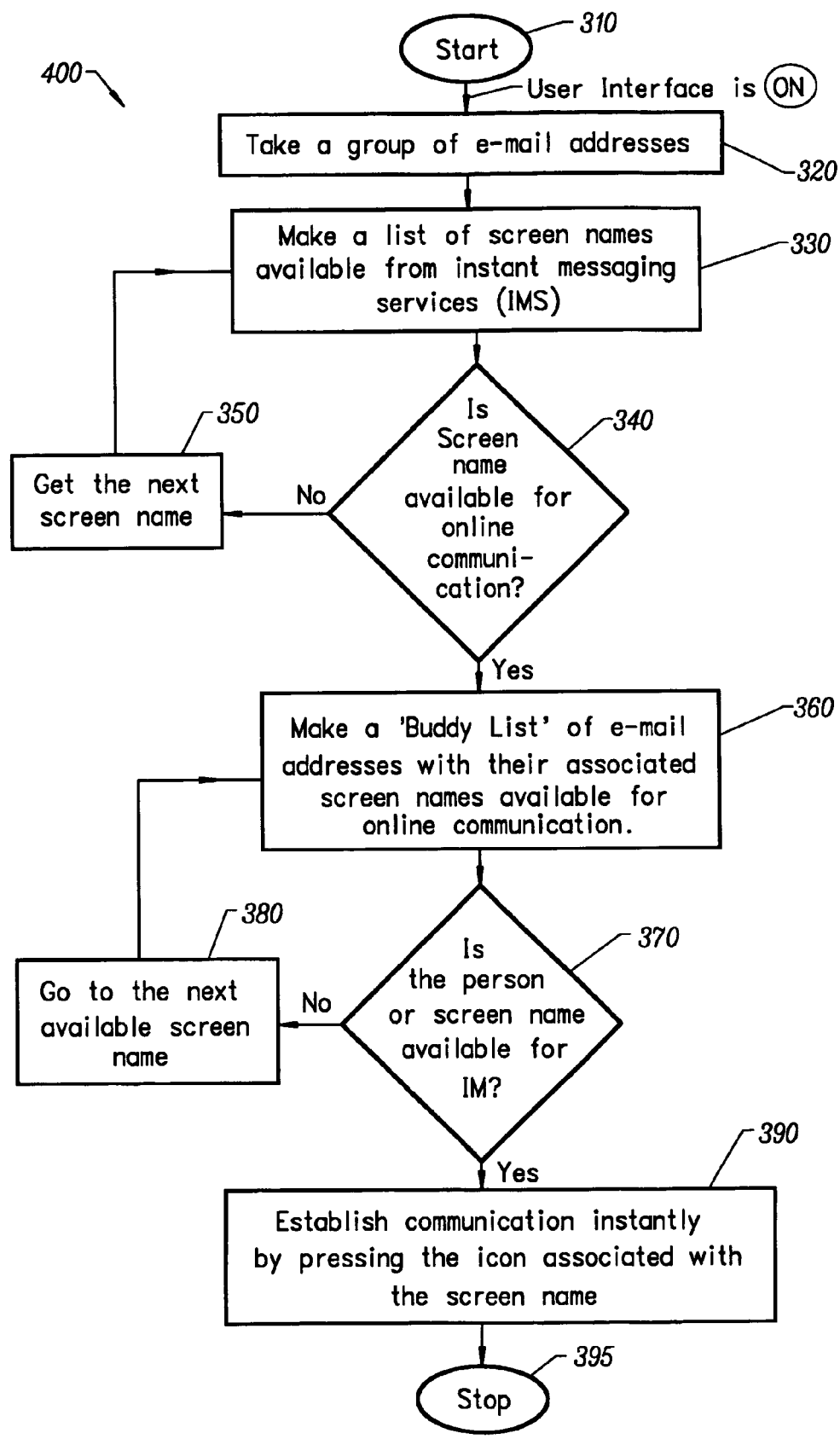
FIG. 5 is a flow chart showing a mechanism for enabling a list of screen names, ex. a buddy list for instant messaging any time according to an alternative embodiment of the invention.

FIG. 5 is a flow chart showing another embodiment of the invention, which comprises enabling a list of screen names into a list, referred to as buddy list for instant messaging any time. In this embodiment, the system sets up a list of screen names for tracking their online presence into a buddy list. The system does an automatic look up of screen names 330 when the user interface is enabled (ON in FIG. 1A) given a list of e-mail addresses 320. It then verifies if the available screen name is associated with that particular e-mail address and available for real-time communication.

If it is not available 350, it looks back at it's list of screen names and goes to the next one until one is found that is available for instant messaging. If the system does find the screen name for that e-mail address available for instant messaging, it makes a buddy list of e-mail address with their associated screen names 360. The buddy list is periodically tested for online presence 370 and updated for establishing real-time communication 390 or returned 380 for the next available screen name for that e-mail address. When real-time communication is established, the icon 500 is pressed for communication with the individual whose screen name is displayed and the process ends 395 with satisfactory completion.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implementation method for instant communication, comprising the steps of:
   receiving in a group of e-mail addresses of an electronic mail system;
   making a request for a list of screen names from an instant messaging service, wherein said screen names of said instant messaging service associated with said e-mail addresses of said electronic mail system;
   automatically verifying screen names that are available for real-time communication;
   correlating said screen names to said e-mail addresses;
   within said electronic mail system, establishing an icon next to said screen names available for real-time communication; and
   within said electronic mail system, establishing instant messaging real-time communication by selecting said icon associated with said screen name.

2. The method of claim 1, further comprising the step of manually verifying screen names associated with said e-mail addresses.

3. The method of claim 2, further comprising the steps of manually verifying screen names associated with said e-mail addresses that are available for real-time communication.

4. The method of claim 3, further comprising the step of making a list of said screen names associated with a particular e-mail address.

5. A computer implemented method for updating an email recipient of available screen names for instant messaging communication, comprising the steps of:
   receiving in a group of user e-mail addresses;
   making a request for a list of user screen names from an instant messaging service associated with said user e-mail addresses;
   automatically verifying available user screen names that are available for real-time communication;
   correlating said available user screen names to said user e-mail addresses;
   making a list of said user e-mail addresses with their associated available user screen names;
   updating said list periodically for establishing said real-time communication; and
   establishing said instant messaging communication instantly by the email recipient pressing, within an electronic mail system, an icon associated with a user's screen name, said user's screen name associated with an e-mail address of said user e-mail addresses.

6. The method of claim 5, further comprising the step of manually verifying screen names associated with said e-mail addresses for communication at a later time.

7. A computer implemented method for instant communication, comprising the steps of:
   receiving a group of e-mail addresses in an electronic mail system;
   identifying screen names that are available for real-time instant message communication;
   correlating said identified screen names to said e-mail addresses;
   establishing icons, within said electronic mail system, next to said e-mail addresses correlated with said identified screen names available for real-time instant message communication; and
   establishing said real-time communication responsive to selection of said icons associated with said screen names.

8. The method of claim 7, identifying the step comprising automatically verifying screen names associated with said e-mail addresses.

9. The method of claim 8, further comprising the step of making a list of said screen names associated with a particular e-mail address.

10. The method of claim 7, identifying the steps comprising manually verifying screen names associated with said e-mail addresses that are available for real-time communication.

11. A computer implemented method for updating a recipient of available screen names for instant communication, comprising the steps of:
   receiving in a group of e-mail addresses;
   identifying screen names that are available for real-time communication;
   correlating said identified screen names to said e-mail addresses;
   making a list of e-mail addresses with their correlated screen names;
   repeatedly updating said list of e-mail addresses and correlated screen names as to availability for real-time communication
   displaying in an electronic mail system graphic window all of: said list of e-mail addresses, said correlated screen names, and an availability icon associated with each of said screen names; and
   establishing said instant communication responsive to selection, in said electronic mail system graphic window, of an icon associated with a user's screen name.

12. The method of claim 11, further comprising the step of manually verifying screen names associated with said e-mail addresses for communication at a later time.

* * * * *